April 10, 1962     A. J. HAYWARD     3,028,778

MACHINE TOOLS

Filed Aug. 21, 1958     4 Sheets-Sheet 2

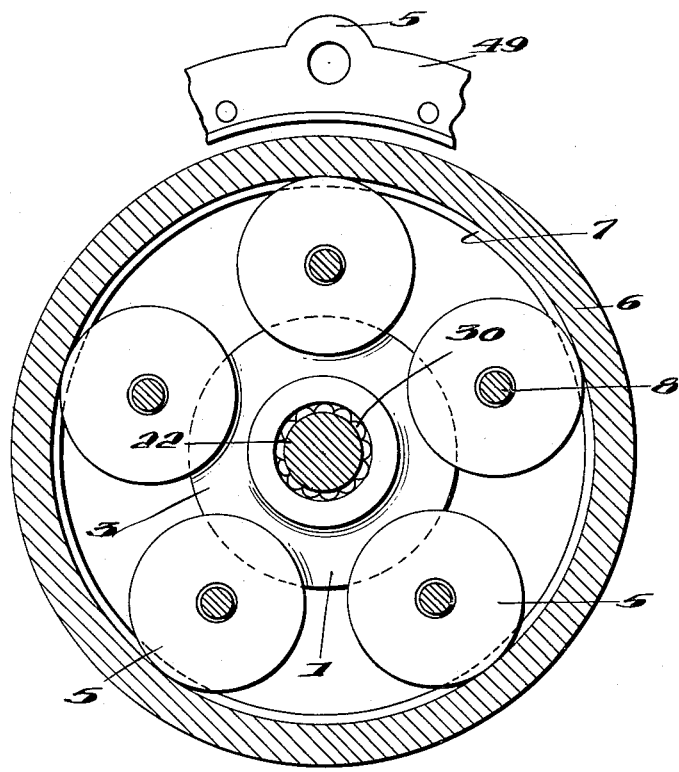

3,028,778
MACHINE TOOLS

Albert John Hayward, Colchester, England, assignor to The George Cohen 600 Group Limited, London, England, a British company
Filed Aug. 21, 1958, Ser. No. 756,476
Claims priority, application Great Britain Nov. 12, 1957
3 Claims. (Cl. 82—29)

This invention relates to machine tools, such as lathes or the like, having a bed provided with a headstock, a cross-slide carried by a saddle on the bed, and mechanism for feeding the cross-slide for carrying out facing (or similar) operations. The invention is particularly concerned with improvements in such machine tools of the kind wherein, for carrying out facing operations at a surface speed which is maintained constant, or substantially constant, the mandrel is driven at variable speed through an infinitely variable drive transmission unit controlled in accordance with movement of the cross-slide so that the mandrel speed increases in hyperbolic progression as the cross-slide feeds inwards and the cutting radius progressively diminishes.

In order to achieve a constant, or substantially constant, surface speed for machining during a facing operation in such an arrangement, it is necessary that the drive ratio to the headstock mandrel should be variable with a high degree of precision in accordance with the cross-slide feed movement, and for this purpose effective use has been made of friction drive transmissions capable of transmitting drive from a driving shaft to a driven shaft at ratios infinitely variable between maximum and minimum values, and of the general kind wherein drive between coaxial driving and driven elements is transmitted by frictional contact under pressure through drive-transmitting elements rotatable on axes which are angularly displaceable, the rolling surfaces of the co-operating elements being arranged so that on angular displacement of said axes the drive ratio between the driving element and the drive-transmitting elements and between the driven elements and the drive-transmitting elements is varied inversely, and mechanism being provided for effecting simultaneous adjustment of said axes.

In infinitely variable friction drive transmissions of the kind referred to, the pressure at the points of frictional contact between the co-operating elements of the transmission requisite for effective operation thereof is applied either by spring loading or by automatic pressure-adjusting means with initial pre-loading, and is of such high order that, while adjustment for angularly displacing the axes of the intermediate drive-transmitting elements for effecting gradual change in ratio can be effected by application of a moderate force to ratio-adjusting mechanism while drive is being transmitted, serious damage to components of the transmission unit may result if excessive force is applied to overcome sliding friction at the pressure points in effecting a sudden change in ratio while the drive is being transmitted, or to overcome static friction at the pressure points in effecting adjustment of ratio while the co-operating rotatable elements of the unit are stationary.

In arrangements using such friction drive transmissions for driving the headstock at variable ratio, and in which the ratio-adjusting mechanism is controlled in accordance with feed movement of the cross-slide, it is essential that, for any particular position of the cross-slide, depending for example on tool-setting requirements, and having regard to the nature of the material to be worked and of the cutting or other tool, it should be possible to readily set the ratio-adjusting mechanism of the infinitely variable transmission to an initial drive ratio which will give the required surface speed for machining. This requirement involves displacement of a control member for the ratio-adjusting mechanism in relation to means operatively connecting the control member with the cross-slide. In known arrangements, however, such displacement of the control member cannot be effected while the co-operating rotatable elements of the transmission are stationary without risk of serious damage to components of the transmission.

For facilitating setting up of a machine tool of the kind referred to, it is desirable that it should be possible to select any predetermined initial drive ratio while the drive transmission is stationary.

The invention has for its primary object to provide improvements in machine tools of the kind referred to embodying a drive transmission of the general kind above defined, whereby selection of an initial drive ratio corresponding to a desired surface cutting or machining speed may be readily effected while the drive transmission is stationary, and whereby feed movement of the cross-slide in either direction, effected manually or otherwise for initially positioning a tool, may be carried out while the drive transmission is stationary without placing excessive stress on the ratio-adjusting mechanism of the infinitely variable drive transmission unit. A further object of the invention is to provide an improved arrangement whereby the control member for the ratio-adjusting mechanism may be readily disconnected from the cross-slide when the machine tool is required for operations other than facing and, under these conditions, to enable any desired change in ratio to be pre-selected while the drive transmission is operating so that the pre-selected ratio may be brought into effect at a later stage when required for machining at a different radius.

According to the present invention there is provided, in a machine tool such as a lathe having a bed provided with a headstock, a cross-slide carried by a saddle on the bed, and mechanism for feeding the cross-slide for carrying out facing operations, the combination of an infinitely variable friction drive transmission unit for driving the headstock mandrel at variable speed, said unit being of the kind wherein drive between co-axial driving and driven elements is transmitted by frictional contact under pressure through drive-transmitting elements rotatable on axes which are angularly displaceable, the rolling surfaces of the co-operating elements being arranged so that on angular displacement of said axes the drive ratio between the driving element and the drive-transmitting elements and between the driven element and the drive-transmitting elements is varied inversely, and simultaneous adjustment of said axes being effected by ratio-adjusting mechanism, a control member for actuating the ratio-adjusting mechanism for varying the drive ratio in said unit, means interconnecting said control member and the cross-slide for adjustment of the drive ratio in said unit in relation to cross-slide movement for maintaining the surface cutting speed constant or within a predetermined range, and means operatively connecting said control member to said ratio-adjusting mechanism and incorporating a resilient pressure-limiting device acting in either direction of movement of the control member to restrict the force applied to said mechanism to an amount sufficient to effect angular displacement of the axes of the drive-transmitting elements when said unit is running, but insufficient to exert excessive stress on components of the unit against the resistance imposed by sliding or static friction at the points of frictional contact.

One form of infinitely variable friction drive transmission unit at present in extensive use for (inter alia) speed control of machine tools, such as lathes, is disclosed, for example, in United States Patent No. 2,469,653, and in its broad aspects the invention is application to a combination embodying such a transmission unit.

More specifically, therefore, the invention includes, in a machine tool such as a lathe having a bed provided with a headstock, a cross-slide carried by a saddle and mechanism for feeding the cross-slide for carrying out facing (or similar) operations, the combination of an infinitely variable friction drive transmission unit of the kind wherein drive at variable ratio is transmitted by coaxial driving and driven elements having friction drive rims or parts of substantially equal diameter engaging a set of intermediate drive-transmitting members in the form of spherical bodies, at least three in number, uniformly spaced circumferentially about the common axis of said elements, said friction drive rims or parts of the elements engaging the spherical bodies in axially spaced planes normal to the common axis of the rotatable elements and being retained in frictional engagement therewith by a rotatable pressure member reacting on the spherical bodies in opposition to said friction drive rims or parts of the elements in a plane substantially midway between said axially spaced planes so that the forces acting on the spherical bodies are symmetrically disposed and balanced, and the coaxial elements being pressed axially towards one another whereby drive is transmitted by frictional contact from one element through the spherical bodies reacting against the pressure member to the other element, and wherein each of the spherical bodies is rotatable on an axle projecting at each end of the respective body for slidable engagement with arcuate radially disposed guides in, or carried by, a casing enclosing the transmission, each said axle also having a spherical-surfaced enlargement engaging a slot in an annular "iris" plate disposed at one side of the spherical bodies and conforming substantially to the curvature thereof, and the slots in the "iris" plate being shaped so that on angular movement of the "iris" plate about the axis of the unit whereby to tilt the axles of the spherical bodies in unison in radial planes with respect to said driving and driven elements, the ratio of drive from one of said elements to the other is altered to give speed variation in hyperbolic progression, a control member for actuating said "iris" plate for varying the drive ratio in said unit, means interconnecting said control member and the cross-slide for adjustment of the drive ratio in said unit in relation to cross-slide movement for maintaining the surface cutting or machining speed constant or within a predetermined range, and means operatively connecting said control member to said "iris" plate and incorporating a resilient pressure-limiting device acting in either direction of movement of the control member to restrict the force applied to said "iris" plate to an amount sufficient to displace the axes of the spherical bodies when said unit is running, but insufficient to exert excessive stress on components of the unit against the resistance imposed by sliding or static friction at the points of frictional contact.

The invention is of particular utility in connection with infinitely variable friction drive transmission units as disclosed in the co-pending application, Serial No. 756,474, now Patent No. 2,931,234, wherein the driving and driven elements co-operating with the spherical bodies are provided on concentric shafts, an outer tubular shaft journalled in a main end part of the casing of the unit, and an inner shaft extending through the outer shaft and rotatably supported concentrically therewith independently of an opposite end part or cover plate structure of the casing so that said main end part of the casing supports the whole of the rotatable assembly of the transmission unit, said elements being pressed axially towards one another by the action of automatic pressure-adjusting means arranged so that torsional stress dependent on the load transmitted imparts proportional axial thrust acting to press the driving and driven elements towards one another, the opposite axial thrust forces on the said elements being resolved in the concentric shaft assembly so that the casing is not stressed thereby.

In a specific embodiment utilising an infinitely variable friction drive transmission unit as disclosed in said co-pending application, Ser. No. 756,474, now Patent No. 2,931,234, the present invention includes an infinitely variable friction drive transmission unit comprising coaxial driving and driven elements provided on concentric outer and inner shafts to engage at their peripheries a circumferentially spaced set of spherical bodies disposed between peripheral friction drive rims or parts of the elements and an outer retaining ring, the outer shaft being tubular and the inner shaft extending therethrough, a casing enclosing the co-operating elements of the transmission including a main end part and an opposite cover plate structure, the said main end part supporting the whole rotatable assembly of the transmission unit, the outer tubular shaft being journalled in bearings in the main part of the casing and being integrally, or otherwise fixedly, provided at its inner end with one of said elements, and the inner shaft extending concentrically through the tubular outer shaft being supported concentrically therewith independently of the cover plate structure of the casing and carrying the other of said coaxial elements so mounted as to be rotatable and axially displaceable with respect to said inner shaft, automatic pressure-adjusting means disposed between an abutment on the inner shaft and the respective element, said pressure-adjusting means being adapted to convert torsional stress into axial thrust so that when drive is being transmitted the coaxial elements are pressed axially towards each other, a thrust bearing between the inner and outer shafts whereby axial pressure exerted by the automatic pressure-adjusting means reacts through the concentric shafts on said elements and through the spherical bodies without stressing the casing, each of the spherical bodies being rotatable on an axle projecting at each end of the respective body for slidable engagement with arcuate radially disposed guides in or carried by said casing, each said axle also having a spherical-surfaced enlargement engaging a slot in an annular "iris" plate disposed at one side of the spherical bodies and conforming substantially to the curvature thereof, the slots in the "iris" plate being shaped so that, on angular movement of the "iris" plate about the axis of the unit whereby to tilt the axles of the spherical bodies in unison in radial planes with respect to said driving and driven elements, the ratio of drive from one of said elements to the other is altered to give speed variation in hyperbolic progression, in combination with a control member for actuating the "iris" plate for varying the drive ratio in said unit, means interconnecting said control member and the cross-slide for adjustment of the drive ratio in relation to cross-slide movement for maintaining the surface cutting or machining speed constant or within a predetermined range, and means operatively connecting said control member to said "iris" plate, said means incorporating a resilient pressure-limiting device acting in either direction of movement of the control member to restrict the force applied to said "iris" plate to an amount sufficient to displace the axes of the spherical bodies when said unit is running, but insufficient to exert excessive stress on components of the unit against the resistance imposed by sliding or static friction at the points of frictional contact.

The resilient pressure-limiting device of the control means may comprise a torsion bar connected between the control member and the ratio-adjusting mechanism of the transmission unit, the torsion bar possessing such degree of torsional resilience that the control member may be moved to any extent within its range of movement corresponding to the range of movement of the ratio-adjusting mechanism without transmitting excessive force thereto. In the application of the invention to a transmission unit as disclosed in the said co-pending application, Ser. No. 756,474, now Patent No. 2,931,234, wherein the "iris" plate is mounted on a spindle or member extending through an axial bore in the cover plate structure of the casing of the transmission unit, the pressure-limiting device of the control means comprises a torsion bar connected to said spindle or member to extend axially therefrom for connection at its other end to a remotely disposed coaxial, or substantially coaxial, control member.

The means operatively connecting the control member to the cross-slide may be adapted to permit of manual adjustment of the control member in relation to the cross-slide. In one embodiment the control member may be provided with a spring-loaded catch member engaging a toothed member, such as a disc or quadrant geared— or otherwise operatively connected—to the cross-slide.

The invention includes a machine tool, such as a lathe, having a bed provided with a headstock and a cross-slide carried by a saddle on the bed, an infinitely variable friction drive transmission unit according to the copending application Ser. No. 756,474, now Patent No. 2,931,-234, arranged to drive the headstock mandrel at variable speed, said unit being mounted with its axis parallel to the axis of the headstock mandrel and having an "iris" plate carried by a coaxial spindle or member and extending parallel with said bed towards the tail end thereof, a manually operable control member fixed to the extending end portion of said torsion bar, said torsion bar possessing such degree of torsional resilience that the control member may be moved to any extent within its range of movement corresponding to the range of movement of the ratio-adjusting mechanism without transmitting excessive force thereto, mechanism connecting said cross-slide and said control member, said mechanism including a shaft extending parallel with said bed, a gear wheel slidably keyed to said shaft and carried by the saddle, said gear wheel co-operating with a rack member on the cross-slide, a toothed member associated with the extending portion of the torsion bar and disposed coaxial therewith, a spring catch member on the control member engageable with said toothed member to position the control member in relation to said toothed member, and means, such as a gear train, interconnecting said shaft and said toothed member. Means may be provided for locking the toothed member against angular movement or rotation when control according to cross-slide feed is not required. When the toothed member is so locked against angular movement or rotation, pre-selection of a desired drive ratio may be obtained by the provision of releasable means adapted to lock the ratio-adjusting mechanism, or an operating member thereof, against angular movement so that the control member may be moved to select a predetermined change in ratio which is automatically taken up when said releasable means is disengaged. Said releasable means may comprise a spring-loaded catch member engageable with a toothed rim or the like on said operating member and adapted to be retained in a withdrawn position when pre-selection of ratio during operation of the drive unit is not required.

The mechanism connecting the cross-slide and control member may embody change wheels whereby the relation between cross-slide feed movement and change in drive ratio may be selected to give constant, or substantially constant, surface cutting or machining speed, or, particularly where a greater range of feed movement of the cross-slide is required, to provide such relation between cross-slide feed movement and drive ratio that the surface cutting or machining speed is kept within a predetermined limited range.

The cross-slide feed movement may be effected by conventional manual control means and/or by means of automatic cross-slide feed mechanism driven independently of the headstock mandrel at a constant speed selected, e.g. by means of change wheels.

The invention is hereinafter described, by way of example, with reference to the accompanying diagrammatic drawings, in which.

Figure 1:
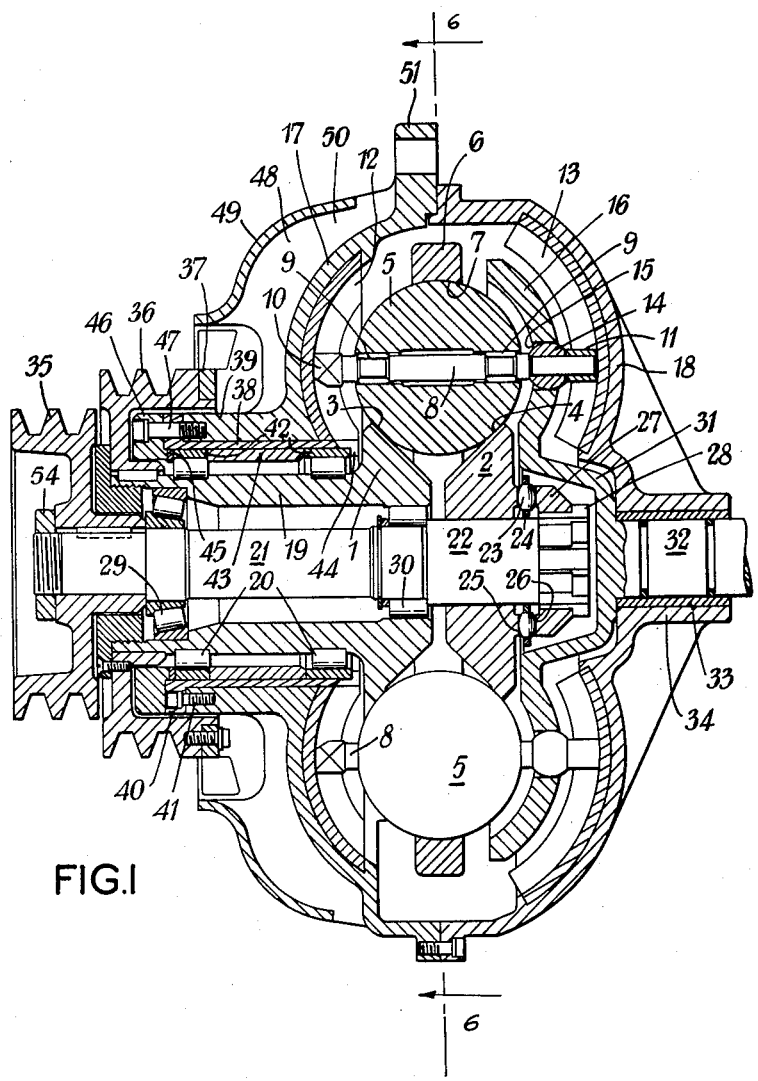
FIG. 1 is a longitudinal section illustrating one embodiment of friction drive transmission unit which is particularly applicable for use in the combination according to the invention.

FIG. 6 is a fragmentary view in vertical transverse section of the transmission unit shown in FIG. 1, taken on line 6—6 of FIG. 1, and with the end cover 18 and iris plate 16 removed.

Figure 2:
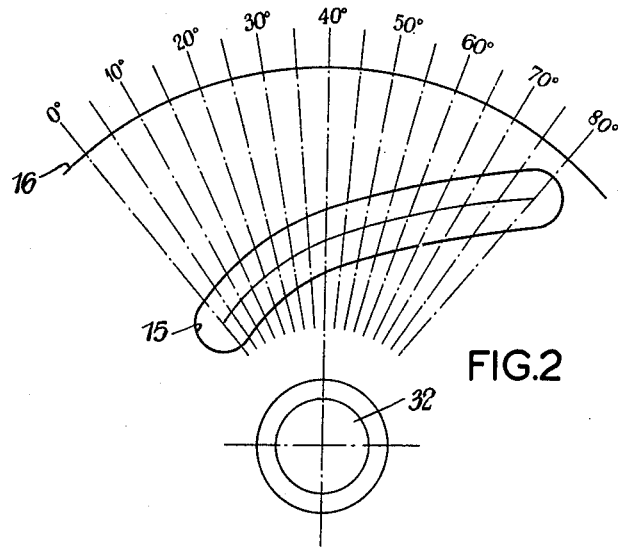
FIG. 2 is a detail view showing the approximate cam formation of the slots in the "iris" plate to obtain variation in speed in hyperbolic progression relative to angular movement of the "iris" plate.
Figure 4:
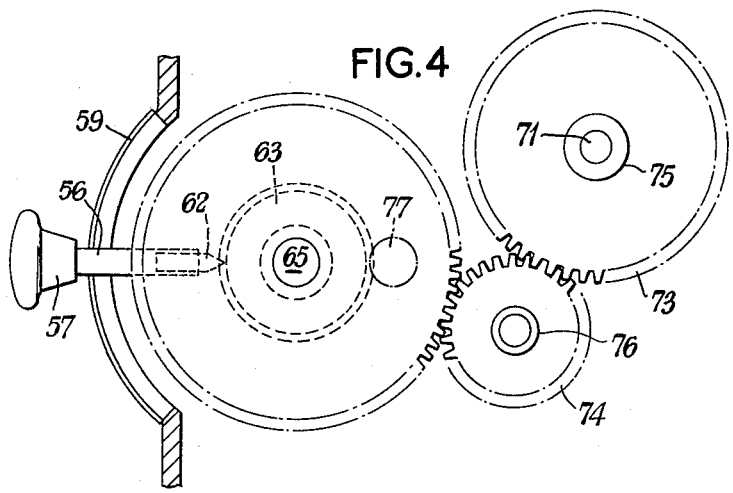
FIG. 4 is a detail view in end elevation of part of the mechanism shown in FIG. 3 connecting the control member for said unit and the cross-slide of a machine tool.
Figure 3:
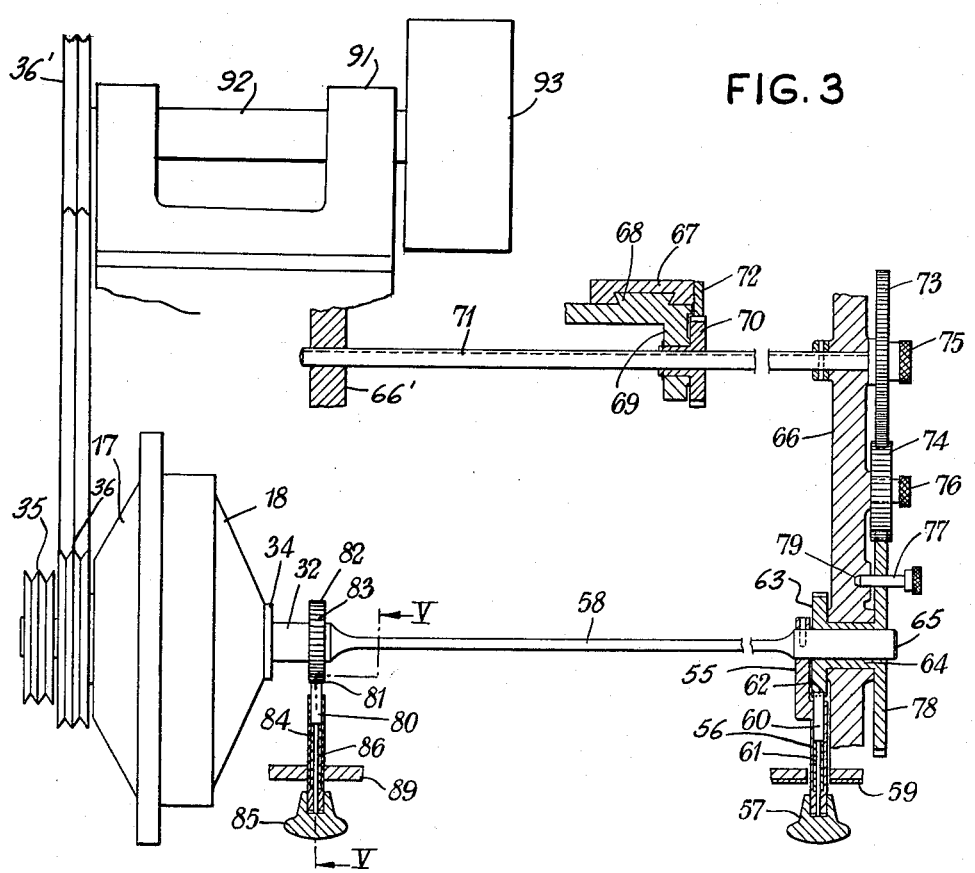
FIG. 3 is a view, partly in longitudinal section, illustrating a preferred embodiment of the combination according to the invention.

FIGS. 1, 2 and 3 of the accompanying diagrammatic drawings show a friction drive transmission unit according to co-pending application, Serial No. 756,475, now Patent No. 2,931,235, which comprises coaxial elements 1, 2, one of which is the driving element and the other the driven element, said elements having peripheral friction drive rims 3, 4 respectively, which are spaced apart axially and engaged by spherical bodies 5, at least three and preferably five in number, which are uniformly spaced circumferentially of the friction drive rims 3, 4 and are retained in engagement therewith by an outer freely rotatable ring 6, the inner surface 7 of which conforms to the curvature of the spherical bodies 5.

The term "spherical body" used herein means a body in which the surfaces which contact the friction drive rims or parts of the driving and driven elements and the pressure member, e.g. the outer retaining ring, throughout the range of inclination of the axle of the body under the control of the "iris" plate, are portions of a sphere.

Each of the spherical bodies 5 is rotatable on an axle 8 journalled in bearings 9 in the spherical body 5, the axle 8 having at one projecting end a flat-faced head 10 and at the other projecting end a flat-faced collar 11 engaging respectively with arcuate radially disposed guides 12, 13 in opposite walls of a casing enclosing the co-operating elements. A spherical-surfaced enlargement 14, in the form of a collar on a projecting portion of the axle 8, engages in a slot 15 in an "iris" plate 16. The slots 15 are so shaped that on angular movement of the "iris" plate 16 about the axis of the unit, the axles 8 are tilted in unison in radial planes with respect to the elements 1, 2 about the axes of the respective spherical bodies 5 to vary the ratio of drive between the elements 1 and 2. The slotted portion of the "iris" plate 16, which is disposed at one side of the spherical bodies 5, conforms substantially to the curvature thereof.

In the known constructions of friction drive transmission units of the kind referred to, the elements 1, 2 are mounted on coaxial shafts journalled in bearings at opposite ends of the casing and projecting therefrom. In a modification, the elements 1, 2 are carried by two concentric shafts, i.e., an outer tubular shaft and an inner shaft extending therethrough, but in this case also the shafts are journalled in bearings at opposite ends of the casing, and in order to achieve the precise axial alignment of the rotating parts which is essential for effective operation, and to avoid undue stresses on the bearings and on the casing, very precise machining of the parts of the casing is required and the casing structure as a whole has to be of relatively heavy construction. Furthermore, the "iris" plate has to be rotatably mounted at its periphery within the casing with the attendant disadvantage that the "iris" plate has to be operated by means of a lever projecting through a slot in the periphery of the casing which is difficult to render oil-tight, or has to be operated by a worm drive arrangement which is unsuitable for sensitive control of the "iris" plate by control means such as hereinafter described. It is also known to arrange a thrust bearing so that oppositely acting axial thrust forces on the shafts are not transmitted to the casing.

In the embodiment shown, the casing enclosing the cooperating elements of the transmission includes a main end part 17 and an opposite cover plate structure 18, the main end part 17 supporting the whole of the rotatable assembly of the transmission. The element 1 is integrally, or otherwise fixedly, provided on an outer tubular shaft 19 which is journalled in bearings, preferably roller bearings 20, in the main end part 17 of the casing. The other element 2 is mounted on a portion 22 of an inner shaft 21 which extends concentrically through the tubular shaft 19. The element 2 is rotatably and axially slidable on the shaft portion 22 and drive between the shaft 21 and the element 2 is transmitted by automatic pressure-adjusting means of the cam and roller type comprising, for example, a number of radially disposed barrel-shaped rollers 23 located in an apertured ring 24 and engaging oppositely disposed cam faces 25, 26 respectively, on the outer face of the element 2 and the inner face of an abutment 27 in the form of a collar keyed to the end of the shaft 21 and abutting a head portion 28 thereof. The automatic pressure-adjusting means acts in a manner well known per se so that on relative rotation between the element 2 and the shaft 21, engagement of the rollers 23 between the cam faces 25, 26 converts torsional stress into axial thrust on the element 2 in a direction towards the element 1, the thrust exerted varying in proportion to the load. Apart from combined rotary and axial movement of the element 2 with respect to the shaft 21 consequent on the operation of the cam and roller pressure-adjusting device, it has been found in practice that when the transmission unit is under heavy load, appreciable distortion of the retaining ring 6 from a true circular form is liable to occur and this results in further axial displacement of the element 2 on the shaft portion 22 consequent on the axial thrust maintained by the cam and roller device. Thus, the element 2 is not fixed in relation to the shaft 21 but has a fully floating action within the limits prescribed by the function of the cam and roller device and the degree of resilience of the retaining ring 6, and changes its position on the shaft 21 in response to any variation in load.

A thrust bearing 29 is provided between the shaft 19 and the shaft 21 so that, for any given axial thrust on the element 2 in a direction toward the element 1, equal opposite thrust reaction on the abutment 27 is transmitted through the shaft 21, thrust bearing 29 and shaft 19 to the element 1. Thus, the pressure-adjusting means has the effect of applying equal and opposite axial thrust forces on the elements 1, 2 in a direction towards one another, whereby the friction drive rims 3, 4 are caused to frictionally engage the spherical bodies 5 with balanced pressures reacting against the freely rotatable retaining ring 6 to give effective transmission of power at all ratios determined by angular adjustment of the "iris" plate.

The thrust bearing 29 preferably is of the taper roller type having tubular rollers to obviate oil-pumping action, and disposed adjacent the outer end of the shaft 19 so as to serve also for journalling the outer end of the shaft 21 concentrically within the shaft 19. Alternatively, a bearing assembly comprising a journal bearing and a thrust bearing may be used in a similar manner. The shaft 21 also may be journalled within the inner end of the shaft 19 by means of a roller bearing 30, but this bearing 30 is not essential. Owing to the symmetrical distribution of the pressures acting on the spherical bodies 5, the latter, reacting in conjunction with the retaining ring 6 against the friction drive rims 3, 4, have a self-centering action on the element 2, whereby the inner end of the shaft 21 will be maintained concentric with the shaft 19.

Inasmuch as the concentric shafts 19, 21 are supported solely by the main end part 17 of the casing, the "iris" plate 16 may extend from a hollow central portion 31 mounted on a spindle or member 32 coaxial with the shaft 21 and journalled in a bearing sleeve 33 in a boss 34 of the cover plate structure 18 to extend therethrough for connection of control means to be hereinafter described.

The inner shaft 21 may be fitted at its outer end with a pulley 35 of V belt or other suitable type, and the shaft 19 similarly may be fitted with a pulley 36, the pulleys 35, 36 being keyed to the respective shafts 21 and 19 and retained in conventional manner. The pulley 36 may comprise a bladed fan structure 37 for creating cooling air currents over the main end part 17 of the casing.

The two parts of the casing may be constructed of sheet metal pressings, or, as shown, of die castings of light metal, such as aluminum or alloy thereof. A die cast main part may be combined with a cover plate structure formed as a pressing. For receiving the bearings 20 journalling the shaft 19, a cylindrical sleeve insert 38 may be inserted in an axial bore in a boss 39 on the main end part 17 of the casing, the sleeve insert 38 having at its outer end a flange 40 whereby it may be secured in the boss 39 by means such as screws 41. Outer races 42 of the bearings 20 and an intermediate spacer sleeve 43 may be positioned between an abutment 44 at the inner end of the sleeve insert 38 and a ring 45, by means of an outer ring 46 abutting the flange 40 of the sleeve insert 38 and secured in position by means of screws 47.

The main end part 17 of the casing may be provided with fins 48 and an outer wall 49 adapted to provide substantially radial or spirally extending air ducts 50 for directing air flow from the fan structure 37 over the main end part 17 of the casing.

The arcuate radially disposed guides 12, 13 also may be provided as inserts in the die castings, the inserts being of any suitable metal or material possessing the requisite strength and/or resistance to wear. Instead of using inserts, the guides 12, 13 may be provided by slots in the die castings having the wearing surfaces hardened in any suitable manner.

The casing may be provided at the top with means, such as a lug 51, by which the unit may be mounted so as to be capable of angular adjustment for drive-tensioning purposes.

In assembling the parts the nut 54 on the outer end of the shaft 21 is adjusted to displace the pulley 35 and the inner race of the thrust bearing 29 on the shaft so that the friction drive rims 3, 4 of the elements 1, 2 engage the spherical bodies with a suitable degree of pre-load to ensure operation of the automatic pressure-adjusting means. On slacking off the nut 54, the element 2 may be displaced axially away from the element 1 to facilitate removal or replacement of the retaining ring 6 and/or the spherical bodies 5.

In machine tools such as lathes, the relation between the speed of the headstock mandrel and the cutting or machining radius is such that, for maintaining a constant surface speed for cutting or machining at any radius, the headstock mandrel speed should increase in hyperbolic progression relative to inward feed movement of the cross-slide. The slots 15 in the "iris" plate 16 are therefore shaped to a cam formation, such as shown in FIG. 2, so that on movement of the "iris" plate in given angular increments, the drive ratio of the unit is varied to give speed variation in hyperbolic progression. If angular adjustment of the "iris" plate is suitably linked to cross-slide feed movement, the mandrel speed will be automatically varied on movement of the cross-slide so that the surface cutting or machining speed will remain constant irrespective of changes in radius, whether such changes are progressive, as in facing operations, or in steps, as in turning operations.

In infinitely variable friction drive transmissions of the general kind referred to, and in particular transmission units wherein drive between coaxial driving and driven elements is transmitted by spherical bodies arranged and operating in the manner described to transmit drive at variable ratio, the operating pressure at the points of frictional contact between the rotatable elements of the transmission unit is of necessity considerable. Changes in ratio while the unit is operating require the application of only small force to the "iris" plate or ratio-adjusting mechanism, the change in ratio being effected by rolling contact on spiral paths between the spherical bodies or drive-transmitting elements and the driving and driven elements. If an attempt is made to change the ratio while the rotatable elements are sttaionary, or even to effect a large and sudden change of ratio while the elements are rotating, static or sliding friction between the elements has to be overcome and this requires the application of such force to the "iris" plate or ratio-adjusting mechanism that serious damage to components of the unit may result. It is therefore desirable that control means for the unit should be adapted to safeguard against possible application of such excessive force to the "iris" plate or ratio-adjusting mechanism.

Control means for operating the "iris" plate or ratio-adjusting mechanism of an infinitely variable friction drive transmission unit such as above described therefore comprises a control member adapted to be moved manually or automatically for varying the drive ratio in said unit and means operatively connecting said control member to the "iris" plate or ratio-adjusting mechanism, said means incorporating a resilient pressure-limiting device acting in either direction of movement of the control member to restrict the force applied to said "iris" plate or ratio-adjusting mechanism to an amount sufficient to effect angular displacement of the axes of the spherical bodies or drive-transmitting elements when said unit is running, but insufficient to exert excessive stresses on components of the unit against the resistance imposed by sliding or static friction at the points of frictional contact.

Arrangements wherein the ratio-adjusting mechanism of an infinitely variable friction drive transmission unit is linked with cross-slide feed movement for maintaining a selected surface cutting or machining speed, are already known, but in the known arrangements it is not possible to vary the selected surface speed or adjust the cross-slide while the drive transmission is stationary without danger of damaging the transmission unit, and thus all such adjustments have to be carried out while the headstock mandrel is rotating. This disadvantage is obviated by the combination according to the invention which incorporates control means as above defined.

As shown in FIG. 3 of the accompanying diagrammatic drawings, a control member 55 having a lever arm 56 provided with a knob 57 or the like for manual operation, is connected to one end of a torsion bar 58, the other end of which torsion bar is connected to the spindle or member 32 carrying the "iris" plate of the drive transmission unit. The intermediate part of the torsion bar 58 is of such length and cross-section as to have such degree of torsional resilience that the control member 55 may be moved to any extent within its range of movement without transmitting excessive force to the "iris" plate. The range of movement of the lever arm 56 corresponds to the range of angular movement of the spindle or member 32 and may be indicated by a suitable scale on a slotted arcuate plate 59. Means may be provided for positioning the control member 55 for selecting a desired drive ratio. Thus, the control member may be provided with a catch member 60 resiliently loaded by means such as a spring 61 and having a wedge-shaped end portion 62 engaging a toothed member 63. The toothed member 63 may be mounted on a sleeve 64 in which an end portion 65 of the torsion bar 58 is journalled, the sleeve 64 being rotatably mounted in a support 66, e.g., part of the bed 66' (FIG. 3) of a machine tool, such as a lathe, having a cross-slide 67 mounted on a saddle 68 carried by the bed in conventional manner. In FIG. 3 there is indicated a conventional headstock 91 of a lathe, in which headstock a mandrel 92 is journaled. A conventional chuck 93 is shown as being fixed to one end of mandrel 92, whilst at the opposite end of the mandrel there is shown a pulley 36' secured to the spindle. As indicated, pulley 36' is adapted to be driven by pulley 36.

The saddle 68 is provided with an arm or bracket 69 in which a gear wheel 70 is journalled, the gear wheel 70 being slidably keyed to a shaft 71 extending parallel with the lathe bed and supported in suitable bearings, for example, as shown. The gear wheel 70 meshes with a rack member 72 fixed to the cross-slide 67 preferably in such manner that it is adjustable with respect to the cross-slide longitudinally thereof. The shaft 71 is interconnected with the toothed member 63 by means of a gear train including gear wheels 73, 74 and 78, the latter gear wheel 78 being integral with, or otherwise fixedly mounted on, the sleeve 64 carrying the toothed member 63. The gear wheels 73, 74 may be change wheels and for this reason are retained in position by knurled nuts 75, 76 respectively. Normally the gear wheel 78 is not locked against rotation by the locking pin 77 shown in the drawing as engaging the hole 79 in the support 66. The purpose of this locking pin 77 will be hereinafter described.

Assuming that the infinitely variable drive transmission unit is stationary, inward or outward movement of the cross-slide 67 effected, for example, by conventional manual control means for setting the tool, causes rotation of the shaft 71 due to the engagement of the rack member 72 with the gear wheel 70. This rotation is transmitted through the gear train 73, 74 and 78 to the toothed member 63 and thence through the catch member 60 and control member 55 to the torsion bar 58 which is thereby twisted to an extent corresponding to the movement of the closs-slide, the member 32 remaining stationary due to the static friction at the points of contact between the rotatable elements of the transmission unit. As soon as the rotatable elements start to rotate, the torsional energy stored in the torsion bar 58 causes angular adjustment of the "iris" plate of the transmission unit so as to take up a drive ratio corresponding to the position of the cross-slide 67.

On the other hand, assuming that the cross-slide 67 is already set at a desired starting position and the drive transmission unit is stationary, any desired drive ratio may be selected by moving the control member 55 in the appropriate direction to a predetermined position indicated by the scale on the plate 59, the catch member 60 engaging the toothed member 63 serving to retain the control member 55 in the position to which it is set. Dependent on the degree of twist imparted to the torsion bar 58, the "iris" plate of the transmission unit will be correspondingly adjusted as soon as the rotatable elements of the transmission unit commence to rotate.

While drive is being transmitted through the transmission unit, any feed movement of the cross-slide 67 will be followed by a corresponding angular adjustment of the "iris" plate without twisting of the torsion bar 58.

When the arrangement is to be used for operations other than facing, i.e., when the link between the cross-slide 67 and the control member 55 is not required, either, or both, of the gear wheels 73, 74 may be removed and the gear wheel 78 locked against rotation by inserting the pin 77 through a hole in the gear wheel 78 to engage the hole 79 in the support 66. The toothed member 63 then functions as positioning means for the control member 55. The lever arm 56, when angularly displaced from one position to another, will be retained in the selected position by the engagement of the wedge-shaped end portion 62 of the catch member 60 with the toothed member 63. If the drive unit is not in operation, the static friction at the points of frictional contact between the rotatable elements will prevent angular movement of the spindle or member 32 so that the torsion bar 58 will be stressed torsionally in one direction or the other. As soon as the rotatable elements of the transmission unit commence to rotate, the torsional force exerted by the torsion bar 58 on the spindle or member 32 will act to displace the "iris" plate angularly to an extent corresponding to the amount by which the control lever arm 56 has been angularly displaced. If the transmission unit is operating when the lever arm 56 is moved, the "iris" plate will follow the movement of the lever arm 56 without twisting the torsion bar 58 unless excessive force is applied. If the pin 77 is removed, the lever arm 56 is freely movable for varying the ratio drive in any desired manner.

Figure 5:
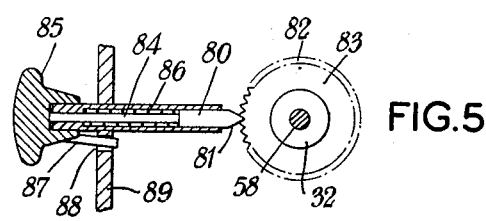
FIG. 5 is a cross-section on the line V—V, FIG. 3.

When the transmission unit is operating without control by the cross-slide feed, it may be desirable to be able to pre-select a predetermined change in ratio to be brought into operation as or when required. For this purpose, releasable means is provided for locking the "iris" plate or ratio-adjusting mechanism or operating member thereof against angular movement. For example, as shown, a spring-pressed plunger 80 having a wedge-shaped portion 81 engaging a toothed rim 82 of an operating member 83 fixed to the spindle or member 32 may have a stem portion 84 provided with a knob 85 or the like whereby it may be withdrawn against the action of a spring 86 so as to be disengaged from the toothed rim 32, the knob 85 having a suitable projection 87 (FIG. 5) which in the engaged position of the plunger is accommodated in a hole 88 in a plate 89 and, by turning movement of the knob 85 when withdrawn, can be positioned to abut the face of the plate 89 so as to retain the plunger in the withdrawn position. Assuming that the drive transmission unit is operating, engagement of the end portion 81 of the plunger 80 with the toothed rim 82 of the member 83 will retain the "iris" plate in the position corresponding to the drive ratio in use. A different drive ratio then may be pre-selected by suitable angular adjustment of the lever arm 56 to a pre-selected position in which it is held by engagement of the end portion 62 of the catch member 60 with the toothed member 63 which is locked by the pin 77. The torsion bar 58 is thereby stressed torsionally in one direction or the other, and when change to the pre-selected ratio is required, it is only necessary to withdraw the plunger 81 by means of the knob 85.

It will be understood that the invention is not limited to the particular embodiment hereinbefore described. For example, the infinitely variable friction drive transmission unit may be a unit such as disclosed in U.S. Patent No. 2,469,653 before referred to, or of any other construction within the general kind referred to in which the drive-transmitting elements are in the form of spherical bodies, as shown in the drawings, or in which the drive-transmitting elements are in the form of discs engaging oppositely disposed concave surfaces of driving and driven elements and angularly adjustable for varying drive ratio. Furthermore, the control means may be of any other suitable form or construction. Thus, it may embody any suitable mechanical or other arrangement embodying lost motion in either direction from a neutral point against the action of spring or other resilient means, or otherwise arranged to limit the pressure which can be transmitted and to provide for storing of energy sufficient to effect adjustment of the "iris" plate or ratio-adjusting mechanism when the drive unit is operating. For use with a transmission unit as disclosed in U.S. Patent No. 2,469,653, the torsion bar or equivalent means could be linked by lever or other mechanism to the operating member of the unit.

I claim:

1. A machine tool, such as a lathe, having a bed provided with a headstock, a driven headstock mandrel, and a cross-slide carried by a saddle on the bed, an infinitely variable friction drive transmission unit arranged to drive the headstock mandrel at variable speed, said unit being mounted with its axis parallel to the axis of the headstock mandrel, and having a ratio-adjusting element carried by a coaxial spindle member, a torsion bar connected to said spindle member and extending parallel with said bed towards the tail end thereof, a control member fixed to the extending end portion of said torsion bar, and mechanism embodying variable ratio gearing connecting the cross-slide and control member wereby the relation between cross-slide feed movement and change in drive ratio may be selected to maintain the surface cutting or machining speed within a predetermined limited range.

2. A machine tool according to claim 1, wherein the control member is manually adjustable in relation to the variable ratio gearing.

3. A machine tool according to claim 1, wherein the control member is provided with a spring-loaded catch member engaging a toothed member operatively connected to the cross-slide.

References Cited in the file of this patent

UNITED STATES PATENTS

| | | |
|---|---|---|
| 2,088,948 | Crzellitzer | Aug. 3, 1937 |
| 2,209,037 | Rigger | July 23, 1940 |
| 2,469,653 | Kopp | May 10, 1949 |
| 2,561,724 | Bickel | July 24, 1951 |
| 2,675,713 | Acker | Apr. 20, 1954 |

FOREIGN PATENTS

| | | |
|---|---|---|
| 767,136 | Germany | Nov. 8, 1951 |